United States Patent
Karube

(10) Patent No.: US 11,966,219 B2
(45) Date of Patent: Apr. 23, 2024

(54) PSEUDO DEFECTIVE PRODUCT DATA GENERATION METHOD

(71) Applicant: HONDA MOTOR CO., LTD., Tokyo (JP)

(72) Inventor: Toshikazu Karube, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/189,307

(22) Filed: Mar. 24, 2023

(65) Prior Publication Data

US 2023/0315076 A1  Oct. 5, 2023

(30) Foreign Application Priority Data

Mar. 30, 2022 (JP) ................................. 2022-057222

(51) Int. Cl.
 *G05B 23/02* (2006.01)
 *G01N 21/88* (2006.01)
(52) U.S. Cl.
 CPC ........... *G05B 23/024* (2013.01); *G01N 21/88* (2013.01); *G05B 23/0243* (2013.01)
(58) Field of Classification Search
 CPC ... G05B 23/024; G05B 23/0243; G01N 21/88
 USPC ......................................................... 701/110
 See application file for complete search history.

(56) References Cited

FOREIGN PATENT DOCUMENTS

| JP | 2005-156334 A |   | 6/2005 |   |           |
|----|---------------|---|--------|---|-----------|
| JP | 2010164506 A  | * | 7/2010 |   |           |
| JP | 2019087181 A  | * | 6/2019 |   |           |
| WO | WO-2018128197 A1 | * | 7/2018 | ............. | B29C 65/18 |

OTHER PUBLICATIONS

JP-2010164506-A (Takesato et al.) (Jul. 29, 2010) (Machine Translation) (Year: 2010).*

* cited by examiner

*Primary Examiner* — Mahmoud Gimie
(74) *Attorney, Agent, or Firm* — Carter, DeLuca & Farrell LLP

(57) ABSTRACT

Preparing actual defective product data and non-defective product data, causing a deep generation model to learn the data and to generate latent variables in which features of the non-defective product data and the actual defective product data are mixed, causing a classification model to learn the latent variables to generate a classified non-defective product and defective product latent variable, deleting the non-defective product latent variable from the classified non-defective product and defective product latent variable to output the defective product latent variable including a gray latent variable, causing a distance learning model to learn the defective product latent variable and the non-defective product latent variable and to delete the gray latent variable, and causing the deep generation model to learn the defective product latent variable that has been obtained and to generate the pseudo defective product data greater in number than the actual defective product data.

2 Claims, 5 Drawing Sheets

PSEUDO DEFECTIVE PRODUCT DATA GENERATION METHOD

BACKGROUND

Technical Field

The present invention relates to a pseudo defective product data generation method for generating a large amount of defective product data of an inspected object in a pseudo manner for use in learning by an inspection device or the like having a machine learning function using a neural network.

Related Art

In recent years, with an inspection device having a machine learning function that uses a neural network, progress has been made on the development of automation technology in an inspection operation for determining whether inspected objects such as various types of industrial products or parts are each a normal product (non-defective product) or an abnormal product (defective product). In such an inspection device, learning is performed by reading many pieces of image data of appearances of the inspected objects that have been classified as the non-defective products and the defective products. Then, the inspection device that has learned classification criteria becomes capable of classifying a new inspected object that has been imaged by a camera as a non-defective product or a defective product.

As described above, in the learning by the inspection device, image data of the non-defective product and image data of the defective product are used. In order to improve inspection accuracy, many pieces of image data are necessary for both the non-defective product and the defective product. However, in a manufacturing site of industrial products and the like, in general, the products are manufactured to produce defective products as few as possible. Hence, there are a lot of non-defective products, whereas there are a very few defective products. For this reason, it is more difficult to collect the image data of the defective product (hereinafter, referred to as "defective product data") than the image data of the non-defective product (hereinafter, referred to as "non-defective product data"), which is relatively easily collectable. Therefore, creation of the defective product data in a pseudo manner is taken into consideration. As a creation method, for example, a method described in JP 2005-156334 A is known.

In such a pseudo defective product data creation method, first, differential data between the non-defective product image and the defective product image is extracted. Next, the number of pieces of pseudo defective product data that should be created (creation number) is set. Then, a random number value is acquired from a random number generation unit for every creation of one piece of pseudo defective product data, a write position of the differential data is determined by use of the random number value, and the non-defective product image and the differential data are synthesized. By repeating such synthesis processing the creation number of times, pieces of pseudo defective product data for the creation number of times that has been set are created.

SUMMARY

In the above-described conventional pseudo defective product data creation method, pieces of defective product data similar to each other are created, in some cases. For this reason, even though a large amount of such defective product data is caused to be learned, it may not be possible to improve determination accuracy of the inspection device sufficiently.

The present invention has been made to address the above drawbacks, and has an object to provide a pseudo defective product data generation method capable of efficiently generating many pieces of pseudo defective product data that can contribute to improvement in determination accuracy, with use of a few pieces of defective product data.

In order to achieve the above object, according to a first aspect, a pseudo defective product data generation method for generating many pieces of defective product data in a pseudo manner that are external appearance images of an inspected object G to be an abnormal product, the pseudo defective product data generation method includes: preparing a plurality of pieces of defective product data of the inspected object that has been actually imaged, respectively as a plurality of pieces of actual defective product data; preparing a plurality of pieces of non-defective product data more than the plurality of pieces of actual defective product data, the plurality of pieces of non-defective product data being external appearance images of the inspected object to be a normal product; causing a predetermined deep generation model to learn the non-defective product data and the actual defective product data and to generate at least a predetermined number of latent variables in which features of non-defective product data and actual defective product data are mixed; causing a predetermined classification model to learn at least the predetermined number of latent variables that have been generated and to generate a classified non-defective product and defective product latent variable in which a non-defective product latent variable that is a latent variable corresponding to the non-defective product data and a defective product latent variable that is a latent variable corresponding to the actual defective product data are classified; deleting the non-defective product latent variable from the classified non-defective product and defective product latent variable, and outputting the defective product latent variable including a gray latent variable that is a latent variable corresponding to gray zone data having the features of the non-defective product data and the actual defective product data; causing a predetermined distance learning model to learn the defective product latent variable including the gray latent variable and the non-defective product latent variable and to delete the gray latent variable; and causing the deep generation model to learn the defective product latent variable that has been obtained and to generate, as pseudo defective product data, the defective product data greater in number than the actual defective product data.

According to this configuration, first, a plurality of pieces of actual defective product data and a plurality of pieces of non-defective product data more than the plurality of pieces of actual defective product data are prepared (actual defective product data preparing step and non-defective product data preparing step). Next, a predetermined deep generation model is caused to learn the non-defective product data and the actual defective product data that have been prepared and to generate at least a predetermined number of latent variables in which the features of the non-defective product data and the actual defective product data are mixed (first learning step). Next, a predetermined classification model is caused to learn the latent variables that have been generated and to generate the classified non-defective product and defective product latent variable in which the non-defective product latent variable and the defective product latent variable are classified (second learning step). Next, the non-defective product latent variable is deleted from the classified non-defective product and defective product latent variable that has been generated, and thus the defective product latent variable including the gray latent variable corresponding to the gray zone data is output (non-defective product latent variable deleting step). Next, a predetermined distance learning model is caused to learn the defective product latent variable including the gray latent variable that has been output and the non-defective product latent variable and to delete the gray latent variable from the above defective product latent variable (third learning step). Then, the deep generation model is caused to learn the defective product latent variable obtained in such a third learning step and to generate, as the pseudo defective product data, pieces of defective product data greater in number than pieces of actual defective product data (fourth learning step).

The pseudo defective product data that has been generated as described above holds a correlation with the actual defective product data, and can also be generated in a larger amount than the actual defective product data that has been prepared. Therefore, by using those pieces of pseudo defective product data for learning by the inspection device having the machine learning function, it is possible to improve the determination accuracy of the inspection device for determining the quality of the inspected object.

According to a second aspect, a pseudo defective product data generation method for generating many pieces of defective product data in a pseudo manner that are external appearance images of an inspected object to be an abnormal product, the pseudo defective product data generation method includes: preparing a plurality of pieces of defective product data of the inspected object that has been actually imaged, respectively as a plurality of pieces of actual defective product data; preparing a plurality of pieces of non-defective product data more than the plurality of pieces of actual defective product data, the plurality of pieces of non-defective product data being external appearance images of the inspected object to be a normal product; causing a predetermined deep generation model to learn the non-defective product data and the actual defective product data and to generate, as mixed data, at least a predetermined number of pieces of data in which features of the non-defective product data and the actual defective product data are mixed; causing a predetermined classification model to learn the mixed data that has been generated and to generate classified non-defective product and defective product mixed data in which non-defective product mixed data that is mixed data corresponding to the non-defective product data and defective product mixed data that is mixed data corresponding to the actual defective product data are classified; deleting the non-defective product mixed data from the classified non-defective product and defective product mixed data, and outputting defective product mixed data including gray mixed data that is mixed data corresponding to gray zone data having the features of the non-defective product data and the actual defective product data; causing a predetermined distance learning model to learn the defective product mixed data including the gray mixed data and the non-defective product data and to delete the gray mixed data; and causing the deep generation model to learn the defective product mixed data that has been obtained and to generate, as pseudo defective product data, the defective product data greater in number than the actual defective product data.

According to this configuration, similarly to the first aspect described above, a plurality of pieces of actual defective product data and a plurality of pieces of non-defective product data more than the plurality of pieces of actual defective product data are prepared (actual defective product data preparing step and the non-defective product data preparing step). Next, a predetermined deep generation model is caused to learn the non-defective product data and the actual defective product data that have been prepared and to generate at least a predetermined piece of data in which the features of the non-defective product data and the actual defective product data are mixed, as mixed data (fifth learning step). Next, a predetermined classification model is caused to learn the mixed data that has been generated and to generate the classified non-defective product and defective product mixed data in which the non-defective product mixed data and the defective product mixed data are classified (sixth learning step). Next, the non-defective product mixed data is deleted from the classified non-defective product and defective product mixed data that has been generated, and the defective product mixed data including gray mixed data corresponding to the gray zone data is output (non-defective product mixed data deleting step). Next, a predetermined distance learning model is caused to learn the defective product mixed data including the gray mixed data that has been output and the non-defective product data and to delete the gray mixed data from the above defective product mixed data (seventh learning step). Then, a deep generation model is caused to learn the defective product mixed data obtained in the seventh learning step and to generate the defective product data greater in number than the actual defective product data, as the pseudo defective product data (eighth learning step).

The pseudo defective product data that has been generated as described above holds a correlation with the actual defective product data similarly to the first aspect described above, and in addition, can be generated in a larger amount than the actual defective product data, so that the same effect as in the first aspect can be obtained.

DETAILED DESCRIPTION

Figure 1:
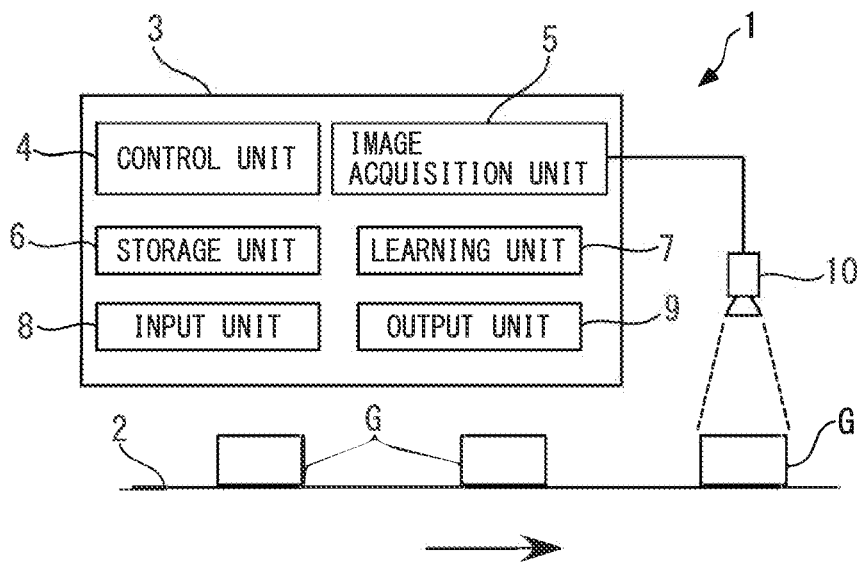
FIG. 1 is a diagram for describing an outline of an inspection system in which many pieces of defective product data to be generated in a pseudo defective product data generation method according to an embodiment of the present invention are used for learning.

Hereinafter, preferred embodiments of the present invention will be described in detail with reference to the drawings. FIG. 1 illustrates an inspection system including a learning model by which learning has been performed by use of many pieces of pseudo defective product data that have been generated in a pseudo defective product data generation method according to an embodiment of the present invention and many pieces of non-defective product data. Such an inspection system 1 is installed in, for example, a manufacturing factory of vehicle components, and by inspecting the appearance of a vehicle component, automatically determines whether a manufactured vehicle component (for example, a cylinder block) is a normal product (non-defective product) or an abnormal product (defective product). Hereinafter, a vehicle component to be inspected will be referred to as an "inspected object".

As illustrated in FIG. 1, the inspection system 1 includes a conveyor 2 for conveying an inspected object G in a predetermined direction at a predetermined speed, and an inspection device 3 for determining the quality of the inspected object G, when the inspected object G reaches a predetermined inspection position. Note that the illustration is omitted, but the inspected object G that has been determined to be a defective product by the inspection device 3 is removed from the conveyor 2, or is conveyed to a storage place dedicated to the defective products.

The inspection device 3 is configured with an information processing device mainly including a computer, and includes a control unit 4, an image acquisition unit 5, a storage unit 6, a learning unit 7, an input unit 8, an output unit 9, and a camera 10.

The control unit 4 includes a CPU, and controls the respective units 5 to 9 of the inspection device 3, and the camera 10. The image acquisition unit 5 acquires, as digital data, an external appearance image of the inspected object G that has been imaged by the camera 10. The storage unit 6 includes a ROM and a RAM, stores various programs to be used in the control of the inspection device 3, and also stores various types of data. The learning unit 7 includes a learning model by which criteria for determining the quality of the inspected object G have been learned. The input unit 8 includes a keyboard and/or a mouse to be operated by an operator, and is configured so that data and/or signals can be input from the outside. The output unit 9 includes a display device such as a display, on which a determination result of the inspected object G is displayed.

Figure 2:
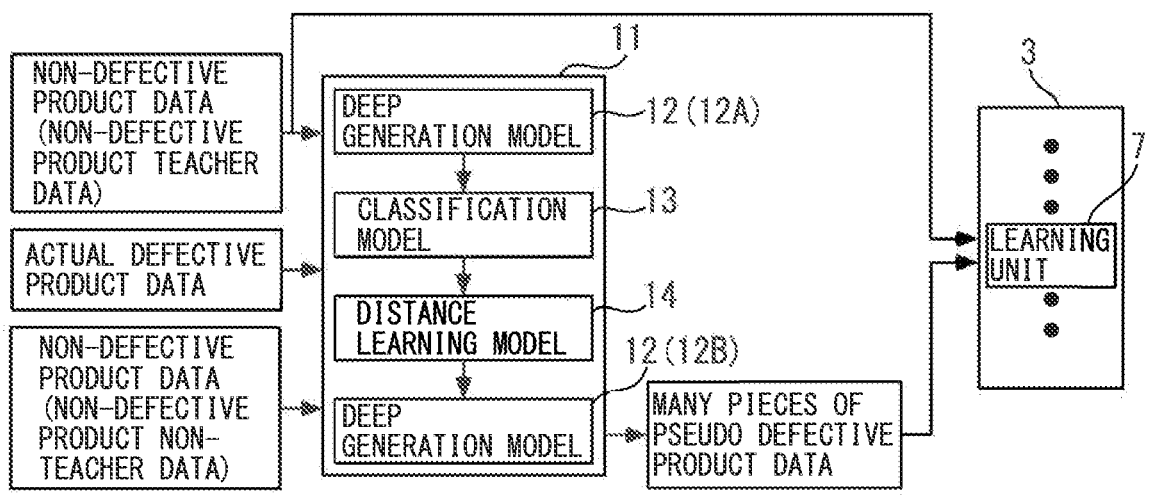
FIG. 2 is a block diagram for describing a configuration of a pseudo defective product data generator and input and output data thereof.

FIG. 2 is a block diagram illustrating a configuration of the pseudo defective product data generator and input and output data thereof. As illustrated in the drawing, such a pseudo defective product data generator 11 is configured with an information processing device of a computer, and includes a deep generation model 12 (12A, 12B), a classification model 13, and a distance learning model 14, each of which is configured with software. Many pieces of non-defective product data and a few pieces of actual defective product data are input into the pseudo defective product data generator 11, and thus many pieces of pseudo defective product data are output. Then, by inputting many pieces of non-defective product data and many pieces of pseudo defective product data into the inspection device 3 so as to cause the learning unit 7 to perform learning, it becomes possible to obtain a learning model with high determination accuracy in determining the quality of the inspected object G.

Note that the above "non-defective product data" denotes image data of an appearance of the inspected object G to be a normal product (non-defective product), whereas the "defective product data" denotes an image of an appearance of the inspected object G to be an abnormal product (defective product). The "actual defective product data" denotes defective product data of the inspected object G that has been actually imaged, whereas the "pseudo defective product data" denotes defective product data of the inspected object G that has been generated in a pseudo manner. In addition, in the following description, in a case where the non-defective product data is distinguished by the presence or absence of a label indicating that it is a non-defective product, the non-defective product data that is applied with the label will be referred to as "non-defective product teacher data", and the non-defective product data that is not applied with the label will be referred to as "non-defective product non-teacher data".

Figure 3:
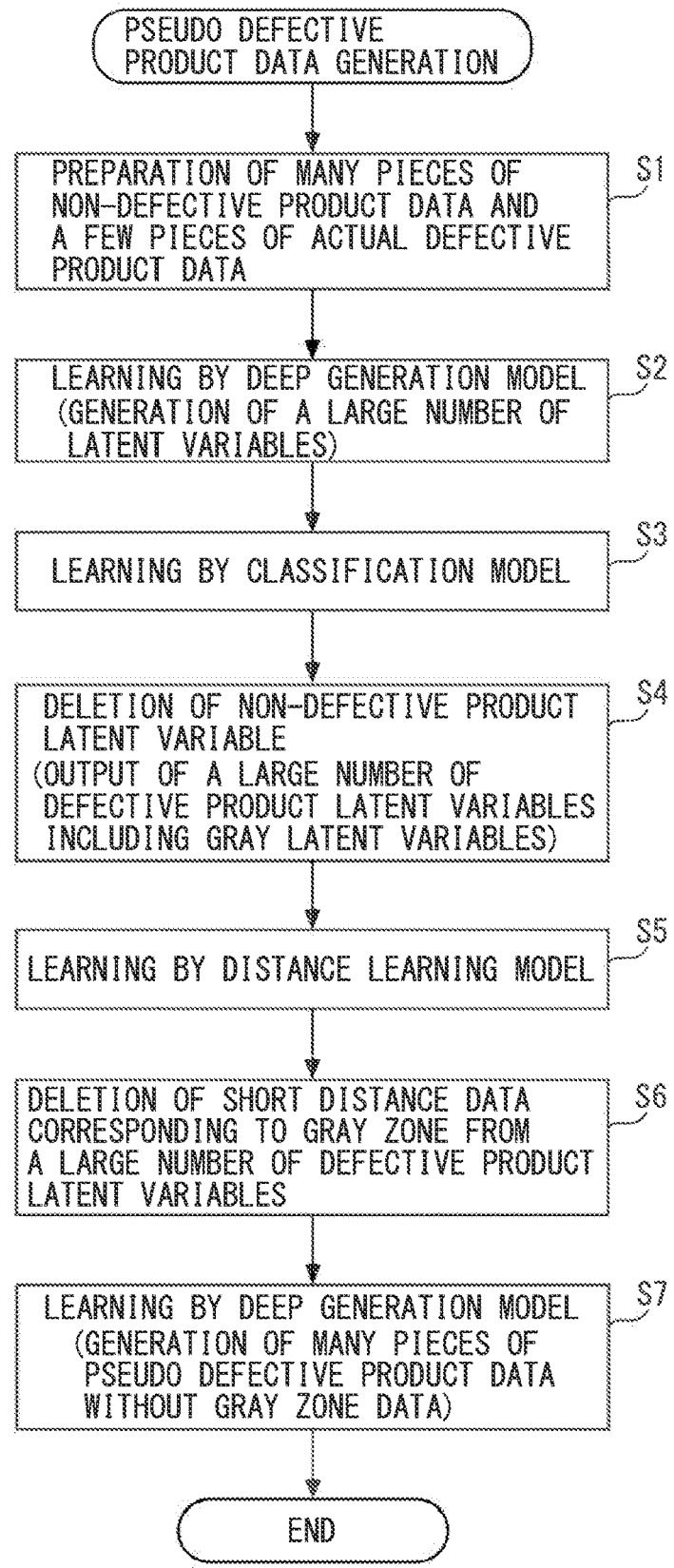
FIG. 3 is a flowchart for describing a pseudo defective product data generation method according to a first embodiment.
Figure 4:
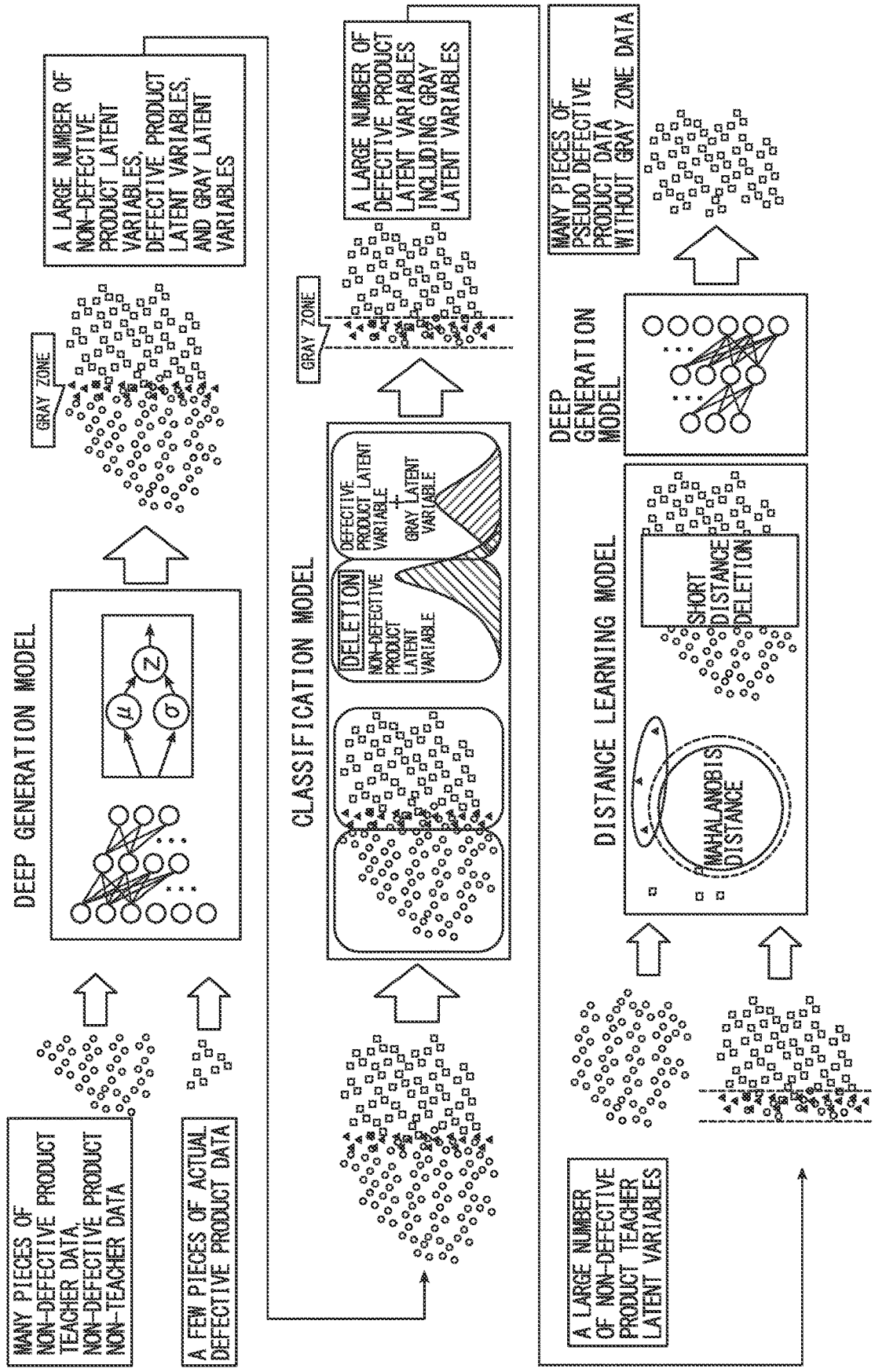
FIG. 4 is a diagram schematically illustrating processing by respective learning models of the pseudo defective product data generator as images, in the pseudo defective product data generation method according to the first embodiment.

FIG. 3 illustrates a procedure of the pseudo defective product data generation method according to the first embodiment of the present invention, and FIG. 4 illustrates processing by the respective learning models 12 to 14 of the pseudo defective product data generator 11, as images. Note that in FIG. 4, "○" indicates the non-defective product data and data corresponding to it, "□" indicates the defective product data and data corresponding to it, and "▲" indicates gray zone data having features of the non-defective product data and the defective product data and data corresponding to it.

As illustrated in FIG. 3, in the pseudo defective product data generation method according to the present embodiment, first, in step 1 (indicated as "S1" in the drawing. Hereinafter, the same will apply), many pieces of non-defective product data and a few pieces of actual defective product data are prepared (non-defective product data preparing step, actual defective product data preparing step). Note that each piece of the non-defective product data and the actual defective product data is high-dimensional data having a predetermined number of pixels and a large number of feature quantities. In addition, the above non-defective product data includes both the non-defective product teacher data and the non-defective product non-teacher data.

Next, learning by the deep generation model 12 (12A) is performed (step 2). Specifically, for example, a variational autoencoder (VAE) or the like is used as the deep generation model 12A, and the deep generation model 12A is caused to learn many pieces of non-defective product data and the few pieces of actual defective product data prepared in step 1 (first learning step). Accordingly, a large number of (for example, 2000 (a predetermined number) or more) low-dimensional (for example, two-dimensional) latent variables, in which features of both the non-defective product data and the defective product data are mixed, are generated.

Next, learning by the classification model 13 is performed (step 3). Specifically, for example, a support vector classifier (SVC) is used as the classification model 13, and the large number of latent variables generated in step 2 are classified into two that are a latent variable corresponding to the non-defective product data (hereinafter, referred to as a "non-defective product latent variable") and a latent variable corresponding to the defective product data (hereinafter, referred to as a "defective product latent variable") (second learning step). In addition, in this classification, a latent variable corresponding to the gray zone data having the features of the non-defective product data and the defective product data (hereinafter, referred to as a "gray latent variable") is classified as the defective product latent variable. Note that the above SVC has performed learning beforehand from the latent variable corresponding to the non-defective product teacher data and the latent variable corresponding to the defective product data.

Next, in step 4, the non-defective product latent variable is deleted from the latent variables that have been classified into two by the above classification model 13 (non-defective product latent variable deleting step). Accordingly, a large number of defective product latent variables including the gray latent variables are output.

Next, learning by the distance learning model 14 is performed (step 5). Specifically, the large number of defective product latent variables, output in step 4, including the gray latent variables, and a latent variable corresponding to the non-defective product teacher data (hereinafter, "non-defective product teacher latent variable") are input into the distance learning model 14. In this case, the distance learning model 14 is caused to learn only the non-defective product teacher latent variable, with the large number of defective product latent variables being input as prediction data, and to measure a Mahalanobis distance to the learning data.

Next, only short distance data corresponding to the gray zone is deleted from the above large number of defective product latent variables (step 6). Accordingly, a large number of defective product latent variables without the gray latent variable are obtained. Note that the above steps 5 and 6 correspond to the third learning step in the present invention.

Then, learning by the deep generation model 12 (12B) is performed (step 7). Specifically, the large number of defective product latent variables obtained in step 6 are input into a decoder of the VEA similar to step 2 (fourth learning step). Accordingly, many pieces of (for example, 1000 or more) high-dimensional pseudo defective product data without the gray zone data are generated.

Many pieces of pseudo defective product data that have been generated as described above hold a correlation with the actual defective product data. Thus, as illustrated in FIG. 2 described above, many pieces of pseudo defective product data that have been generated and many pieces of non-defective product teacher data are input into the inspection device 3, and are caused to be learned by the learning unit 7, so that a learning model with high determination accuracy in determining the quality of the inspected object G can be obtained. As a result, in the inspection system 1, the quality of the inspected object G can be determined with high accuracy.

Figure 5:
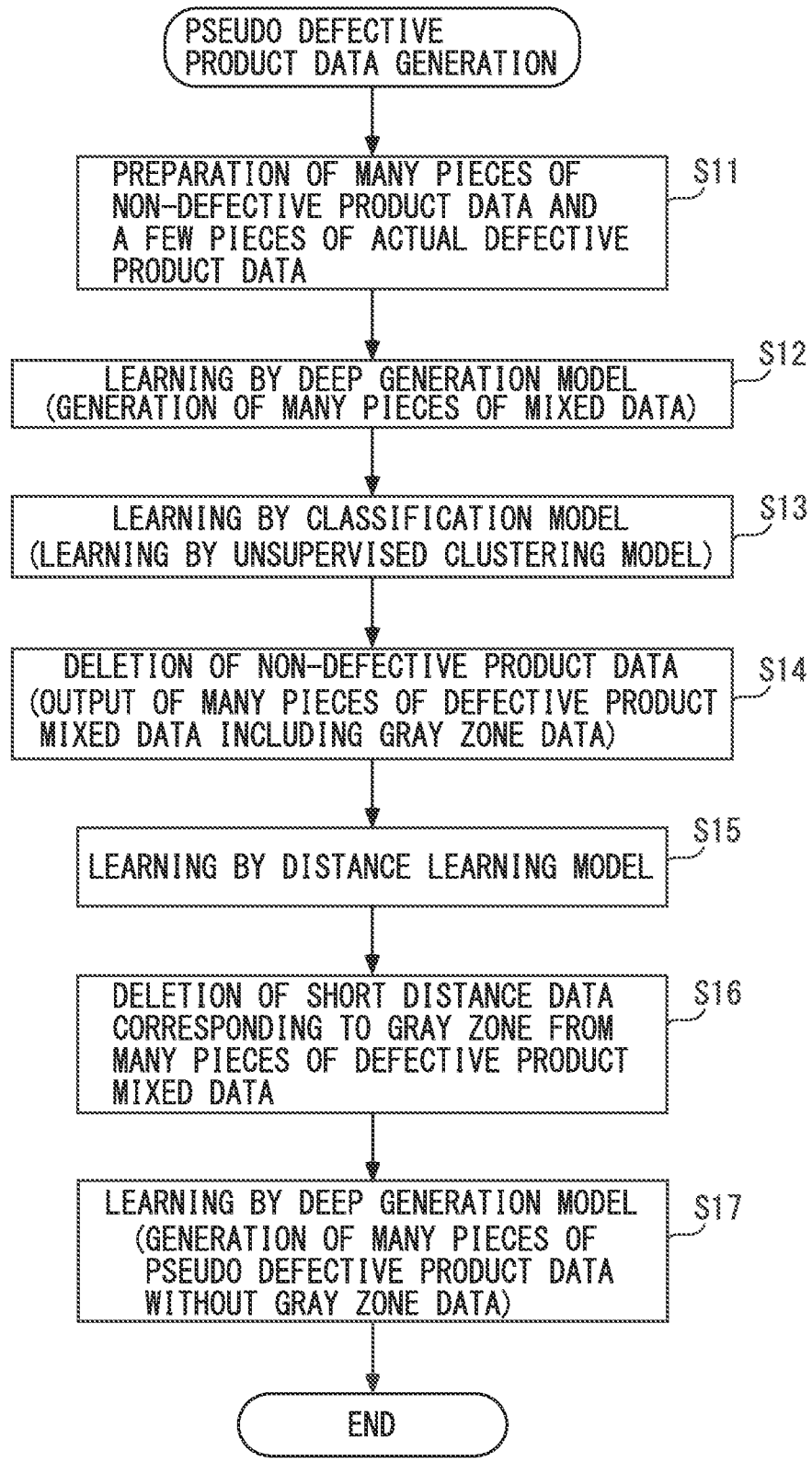
FIG. 5 is a flowchart for describing a pseudo defective product data generation method according to a second embodiment.
Figure 6:
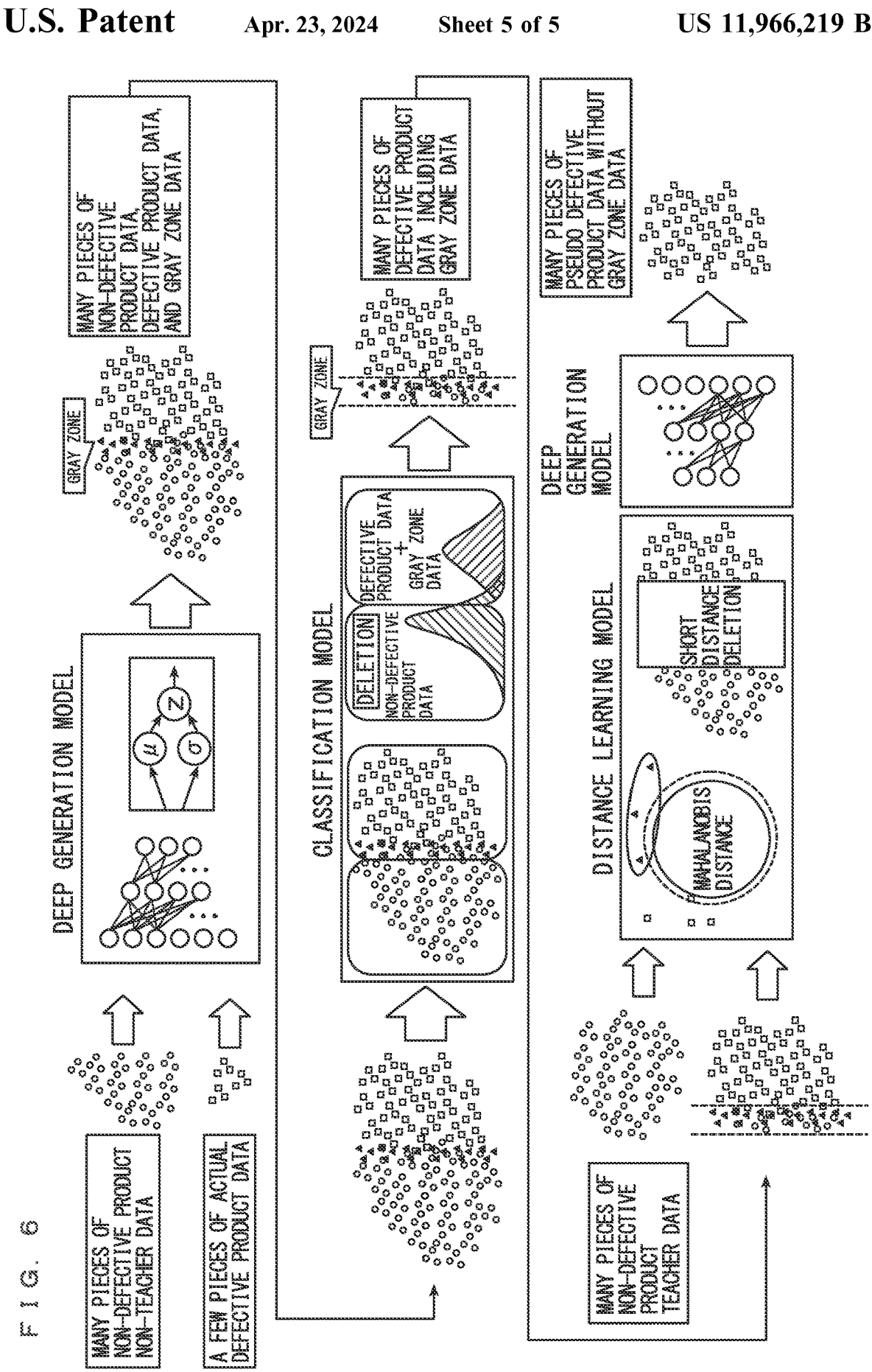
FIG. 6 is a diagram similar to FIG. 4, in the pseudo defective product data generation method according to the second embodiment.

Next, referring to FIGS. 5 and 6, a pseudo defective product data generation method according to a second embodiment of the present invention will be described. As illustrated in FIG. 5, in the pseudo defective product data generation method according to the present embodiment, first, in step 11, similarly to step 1 in the first embodiment, many pieces of non-defective product data and a few pieces of actual defective product data are prepared (non-defective product data preparing step, actual defective product data preparing step).

Next, learning by the deep generation model 12 (12A) is performed (step 12). Specifically, in a similar manner to the first embodiment, the VAE or the like is used as the deep generation model 12A, and the deep generation model 12A is caused to learn many pieces of non-defective product non-teaching data of the non-defective product data and the few pieces of actual defective product data prepared in step 11 (fifth learning step). Accordingly, many pieces of (for example, 2000 (a predetermined number) or more) mixed data, in which features of both the non-defective product data and the defective product data are mixed, are generated.

Next, learning by the classification model 13 is performed (step 13). Specifically, for example, an unsupervised clustering model is used as the classification model 13, and many pieces of mixed data generated in step 12 are clustered on a one-to-one basis into non-defective product mixed data corresponding to the non-defective product data and defective product mixed data corresponding to the defective product data (sixth learning step).

Next, in step 14, the non-defective product mixed data is deleted from the classified non-defective product and defective product mixed data that has been classified into two by the classification model 13 (non-defective product mixed data deleting step). Accordingly, the defective product mixed data, including the gray mixed data that is mixed data corresponding to the gray zone data, is output.

Next, learning by the distance learning model 14 is performed (step 15). Specifically, many pieces of defective product mixed data including the gray mixed data output in step 14 and many pieces of non-defective product teacher data are input into the distance learning model 14. In this case, the distance learning model 14 is caused to learn only the non-defective product teacher data, with many pieces of defective product mixed data being input as the prediction data, and to measure a Mahalanobis distance to the learning data.

Next, only the short distance data corresponding to the gray zone is deleted from the above many pieces of defective product mixed data (step 16). Accordingly, many pieces of defective product mixed data without the gray mixed data are obtained. Note that the above steps 15 and 16 correspond to the seventh learning step in the present invention.

Then, learning by the deep generation model 12 (12B) is performed (step 17). Specifically, many pieces of defective product mixed data obtained in step 16 are input into the decoder of the VEA similar to the above step 12 (eighth learning step). Accordingly, many pieces of high-dimensional pseudo defective product data without the gray zone data are generated.

Many pieces of pseudo defective product data that have been generated as described above holds a correlation with the actual defective product data. Thus, the same effect as in the first embodiment described above, that is, many pieces of pseudo defective product data that have been generated and many pieces of non-defective product teacher data are caused to be learned by the learning unit 7 of the inspection device 3, so that a learning model with high determination accuracy in determining the quality of the inspected object G can be obtained. As a result, in the inspection system 1, the quality of the inspected object G can be determined with high accuracy.

Note that the present invention is not limited to the above-described embodiments, and can be implemented in various modes. For example, in an embodiment, the VAE is used as the deep generation model, and the SVC or the unsupervised clustering model is used as the classification model. However, a model of any other algorithm is adoptable as the deep generation model or the classification model.

In addition, the detailed configurations of the inspection system 1 and the pseudo defective product data generator 11, which have been described in the embodiments, are merely examples, and can be appropriately changed within the scope of the gist of the present invention.

What is claimed is:
1. A pseudo defective product data generation method for generating many pieces of defective product data in a pseudo manner that are external appearance images of an inspected object to be an abnormal product, the pseudo defective product data generation method comprising:

preparing a plurality of pieces of defective product data of the inspected object that has been actually imaged, respectively as a plurality of pieces of actual defective product data;

preparing a plurality of pieces of non-defective product data more than the plurality of pieces of actual defective product data, the plurality of pieces of non-defective product data being external appearance images of the inspected object to be a normal product, wherein the plurality of non-defective product data includes both the non-defective product teacher data and the non-defective product non-teacher data;

causing a predetermined deep generation model to learn the non-defective product data and the actual defective product data and to generate at least a predetermined number of latent variables in which features of non-defective product data and actual defective product data are mixed;

causing a predetermined classification model to learn at least the predetermined number of latent variables that have been generated and to generate a classified non-defective product and defective product latent variable in which a non-defective product latent variable that is a latent variable corresponding to the non-defective product data and a defective product latent variable that is a latent variable corresponding to the actual defective product data are classified;

deleting the non-defective product latent variable from the classified non-defective product and defective product latent variable, and outputting the defective product latent variable including a gray latent variable that is a latent variable corresponding to gray zone data having the features of the non-defective product data and the actual defective product data;

causing a predetermined distance learning model to learn the defective product latent variable including the gray latent variable and the non-defective product latent variable and to delete the gray latent variable;

causing the deep generation model to learn the defective product latent variable that has been obtained and to generate, as pseudo defective product data, the defective product data greater in number than the actual defective product data; and inspecting an object using the deep generation model.

2. A pseudo defective product data generation method for generating many pieces of defective product data in a pseudo manner that are external appearance images of an inspected object to be an abnormal product, the pseudo defective product data generation method comprising:

preparing a plurality of pieces of defective product data of the inspected object that has been actually imaged, respectively as a plurality of pieces of actual defective product data;

preparing a plurality of pieces of non-defective product data more than the plurality of pieces of actual defective product data, the plurality of pieces of non-defective product data being external appearance images of the inspected object to be a normal product, wherein the plurality of non-defective product data includes both the non-defective product teacher data and the non-defective product non-teacher data;

causing a predetermined deep generation model to learn the non-defective product data and the actual defective product data and to generate, as mixed data, at least a predetermined number of pieces of data in which features of the non-defective product data and the actual defective product data are mixed;

causing a predetermined classification model to learn the mixed data that has been generated and to generate classified non-defective product and defective product mixed data in which non-defective product mixed data that is mixed data corresponding to the non-defective product data and defective product mixed data that is mixed data corresponding to the actual defective product data are classified;

deleting the non-defective product mixed data from the classified non-defective product and defective product mixed data, and outputting defective product mixed data including gray mixed data that is mixed data corresponding to gray zone data having the features of the non-defective product data and the actual defective product data;

causing a predetermined distance learning model to learn the defective product mixed data including the gray mixed data and the non-defective product data and to delete the gray mixed data;

causing the deep generation model to learn the defective product mixed data that has been obtained and to generate, as pseudo defective product data, the defective product data greater in number than the actual defective product data; and inspecting an object using the deep generation model.

* * * * *